Patented Apr. 6, 1954

2,674,578

UNITED STATES PATENT OFFICE 2,674,578

PROCESS FOR PREVENTING CLOUDINESS IN REFINED LUBRICATING OILS

John Harry Osvald Lindhe, Nynashamn, Sweden, assignor to A. Johnson & Co., Stockholm, Sweden, a body corporate of Sweden No Drawing. Application September 24, 1951, Serial No. 248,100

Claims priority, application Sweden September 26, 1950

4 Claims. (Cl. 252—56)

This invention relates to a treatment of lubricating oils and, more particularly, the invention has for its object the prevention of cloudiness in refined lubricating oils, due to flocculation of paraffin waxes contained therein.

When refining lubricating oils containing small amounts of paraffin waxes which are solid at normal temperature it sometimes happens that a part of these waxes does not remain completely dissolved in the refined oil but precipitates at temperatures up to 50° C. above the solidifying point of the oil itself, the precipitated waxes forming "snowlike" flocs or clusters in the oil. The total quantity of the precipitated paraffin wax is often very small, about 0.01% of the weight of the oil, and it is technically of no importance for the function of the oil as a lubricant, since the solidifying point of the oil per se is low. However, the cloudiness tends to give the impression of inferior quality of the oil.

According to the present invention the above-mentioned disadvantage is obviated by adding to the refined lubricating oil small amounts of high-molecular resinous polar substances capable of forming with the molecules of the paraffin waxes present in the oil molecular complexes which are soluble in the oil, whereby the occurrence of cloudiness in the oil is prevented.

It has been found that such high-molecular cloudiness-preventing substances are present in raw montan wax and can be recovered therefrom by extraction of the wax with aromatic hydrocarbon solvents, such as toluene. The extract thus obtained may either be used as such, or also after removal of the solvent therefrom for example by distillation.

In order to further increase the content of the cloudiness-preventing substances in the extracts or products obtained as indicated above, said extracts or products may be subjected to renewed extraction and concentrating treatment.

The amount of the cloudiness-preventing additive which according to the invention is added to the refined lubricating oil may vary within wide limits, according to the concentration of the active high-molecular substances in the added product, the kind and nature of the lubricating oil and other facts. As examples may be mentioned amounts within the range of 0.05–0.001% by weight of the oil to be treated.

As an example of the practical application of the process according to the invention it may be mentioned that lubricating oil in which within 24 hours clusters of paraffin waxes formed at +20° C. was mixed with 0.005% by weight of high-molecular products recovered from montan wax as indicated by extracting raw montan wax with aromatic hydrocarbons, filtering the extract at about +20° C. and distilling off the solvent. The lubricating oil thus treated remained completely clear and without any precipitation for several months, at +20° C. and even lower temperatures.

I claim:

1. Process for preventing cloudiness in refined lubricating oils due to flocculation of paraffin waxes contained therein, which comprises adding to the refined lubricating oil small amounts of high-molecular resinous polar substances capable of forming with the molecules of paraffin waxes present in the oil molecular complexes which are soluble in the oil; said high-molecular resinous polar substances being obtained from the extract produced by extracting raw montan wax with an aromatic hydrocarbon.

2. Process according to claim 1, wherein the refined lubricating oil is admixed with an extract of high-molecular resinuous polar substances recovered from raw montan wax by extraction with toluene and subsequent removal of the solvent.

3. Process according to claim 1, wherein the high-molecular resinous polar substances are added to the refined lubricating oil in amounts within the range 0.05–0.001% by weight of the oil.

4. In the process of preventing cloudiness in refined lubricating oils, the steps which comprise extracting raw montan wax with toluene, recovering the high-molecular resinous polar substances present in the resulting extract and adding from about 0.05 to 0.001% of these resinous polar substances to the refined lubricating oil.

References Cited in the file of this patent

UNITED STATES PATENTS

| Number | Name | Date |
|---|---|---|
| 1,901,240 | Henriksen | Mar. 14, 1933 |
| 1,944,851 | Smith | Jan. 23, 1934 |
| 2,023,369 | Limburg | Dec. 3, 1935 |
| 2,024,106 | Levin | Dec. 10, 1935 |
| 2,029,382 | Merrill | Feb. 4, 1936 |
| 2,080,088 | Moser | May 11, 1937 |
| 2,186,909 | Pollock | Jan. 9, 1940 |
| 2,525,076 | Mikeska et al. | Oct. 10, 1950 |